United States Patent Office 3,452,615
Patented July 1, 1969

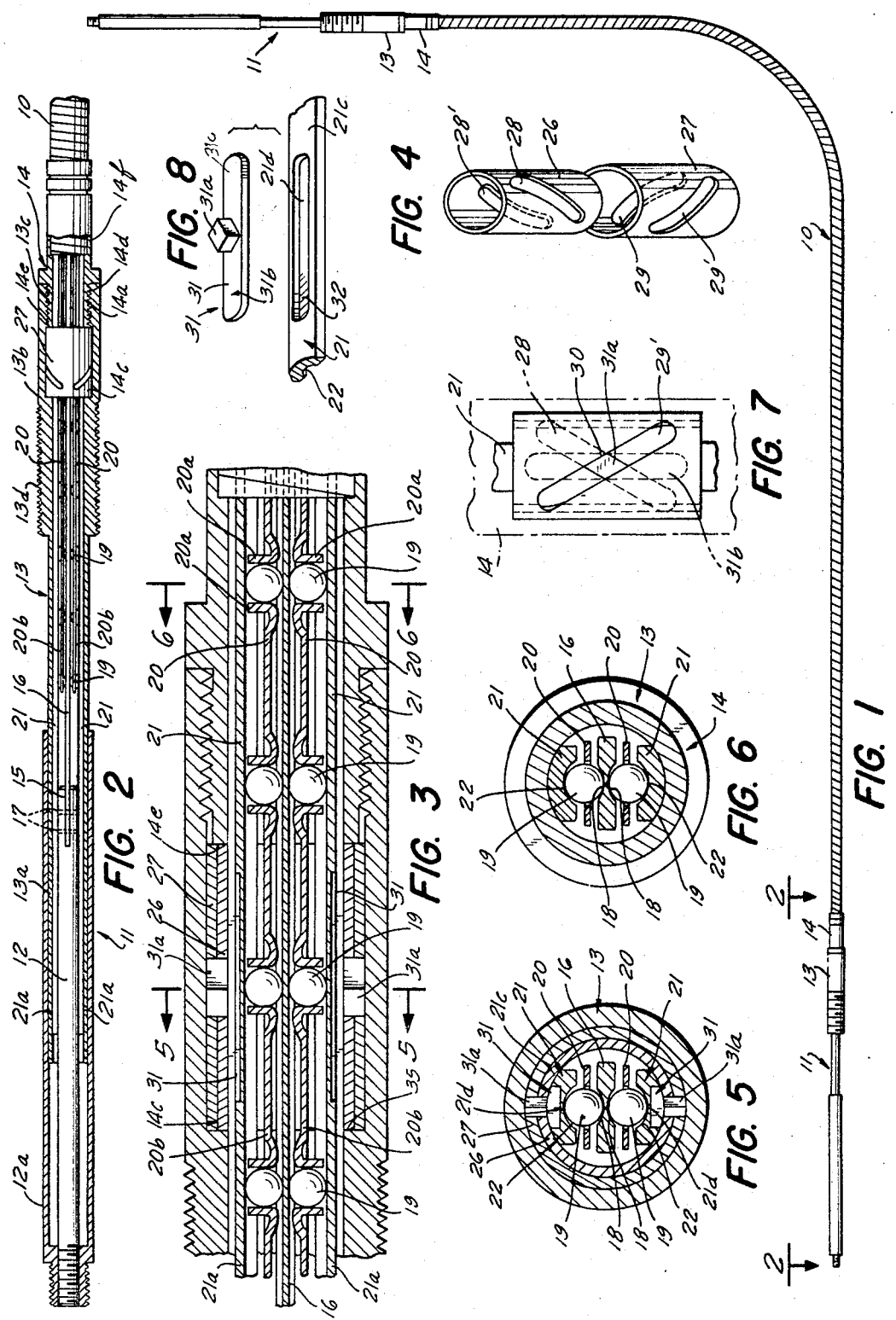

---

3,452,615
TUBULAR FLEXIBLE REMOTE CONTROL DEVICE
Walter V. Gregory, Jr., Danbury, Conn., assignor to Controlex Corporation of America, North Salem, Croton Falls, N.Y., a corporation of New York
Filed Oct. 12, 1967, Ser. No. 674,779
Int. Cl. F16c 1/20
U.S. Cl. 74—501                               7 Claims

---

ABSTRACT OF THE DISCLOSURE

Tubular flexible remote control device of the push-pull type in which a flat flexible force transmitting member is adapted to move to and fro in a tubular sheath; the transmitting member being mounted between spaced rolling elements, such as bearing balls, which in turn are mounted between a pair of oppositely disposed guideways in the sheath; the sheath being secured at its ends to end members in which are mounted means for anchoring the ends of the guideways; the balls, guideways and transmitting members passing through the anchoring means.

---

This invention relates to tubular flexible remote control devices of the push-pull type for transmitting traction and compressive forces to a controlled element situated at a distance from the operating part.

BACKGROUND OF THE INVENTION

Field of the invention

Speaking generally, control devices of the push-pull type are usually constructed of a flexible tubular sheath along the axis of which is arranged an elongate, generally flat, force transmitting member which is slidable lengthwise in the tubular sheath to transmit the forces created at the operating part at or near one end of the sheath to the controlled element at or near the other end of the sheath. The force transmitting member is retained and guided in its movements by two rows of rolling elements such as balls, like ball bearings, which are in rolling engagement with longitudinal grooves or ball tracks provided in two opposite side faces of the force transmitting member and which balls are in rolling engagement with longitudinal grooves or ball tracks provided in opposed faces of two outer elongate members or races, each extending in spaced, substantial parallelism with a side face of the force transmitting member. The balls in each of said two oppositely disposed rows are usually maintained at given, longitudinally spaced, intervals by a ball cage which is usually a strip of suitable material, such as metal; there being such a cage for accommodating the balls in the row of balls on one side of the force transmitting member and positioned between one of the outer races and the force transmitting member and a similar cage for accommodating the balls in the row of balls on the other side of the force transmitting member and positioned between the other of the outer races and the force transmitting member.

In push-pull devices of the type mentioned above now in use, it has been customary to provide means for anchoring the end of one of the outer races in such manner that there is practically no longitudinal play between it and the anchoring means while provision is made for longitudinal movement relatively between the anchoring means and the other of the outer races; the object being to take care of the length differentials which occur when the control assembly is flexed through curves. The anchoring means were contrived to guide the force transmitting member in its longitudinal movements and to maintain the outer ends of the races properly spaced.

Description of the prior art

As an example of anchoring means contrived to take care of or compensate for length differentials of the outer races which occur when the control assembly is flexed through curves, reference is made to Ellinger, U.S. Patent No. 3,287,990 issued Nov. 29, 1966, entitled, Flexible Remote Control Device.

That patented device, like many other known devices of the push-pull type, does not allow the longitudinal movement of the balls in the two oppositely disposed rows of balls in the strip cages to pass through the anchoring means. This being the case, the force transmitting member in such prior art control devices of the push-pull type is unsupported in a certain length of the force transmitting element inwardly of the anchoring means. And the longer the stroke of the force transmitting member, the longer is the portion of it that may be unsupported by the balls. On the one hand, the unsupported length of the transmitting member may be in traction, i.e. under tension, and on the other, it may be under compression. It is particularly important that when the force transmitting member is under compression or tension, that sufficient support be provided along its length and at close enough intervals that it, or the reactive outer ball races, will not buckle or unduly bend in the areas inwardly of the anchoring means. Of course, it will be understood that the control devices, as a practical matter, must be designed to avoid bulkiness or unduly large size, so the solution to the problem of avoiding unwanted bending of the force transmitting member when large forces are applied does not feasibly lie in enlarging the size of the operating parts of the device in order to obtain more strength, but rather in a design that provides substantially greater strength within the dimensions of a device of small dimensions suitable for the purpose to be served by it.

SUMMARY OF INVENTION

This invention provides a device which is a substantial advance over the device disclosed in the above mentioned patent. In accordance with this invention, a flexible remote control device of the push-pull type is provided in which the anchoring device comprising two concentric slotted cylinders and the means for connecting them to the outer guideways or races of the remote control device are so contrived that not only the force transmitting member may pass to and fro through the anchoring device, but also the guideways and the balls in spaced relation may pass to and fro through the anchoring device.

The invention further provides followers connecting the two outer oppositely disposed outer guideways or races to the concentric sleeve anchoring device which are so contrived that more bearing area is provided and no impediment is imposed to the longitudinal movement of the balls through the central opening of the concentrically mounted sleeves which serve as an anchoring device.

Furthermore, the invention provides a remote control device which eliminates sliding friction between the force transmitting member and the anchoring means by providing roller bearing means between the anchor means and the force transmitting member passing therethrough and as a consequence prevents unwanted galling action which sometimes resulted from sliding friction inherent in certain of the prior art devices.

Although the novel features which are believed to be characteristic of the invention are pointed out in the annexed claims, the invention itself as to its objects and advantages and the manner in which it may be carried out, may be better understood by reference to the following more detailed description, taken in connection with the accompanying drawings, forming a part hereof.

BRIEF DESCRIPTION OF THE DRAWINGS

FIG. 1 is an exterior view of a flexible remote control device embodying the invention;

FIG. 2 is a longitudinal section taken along line 2—2 of FIG. 1 showing in larger scale the interior construction of one end of the device;

FIG. 3 is a sectional view in still larger scale showing the construction and arrangement of the parts in the anchoring portion of the device;

FIG. 4 is an exploded, perspective view of the two tubes to which one end of each of the outer races are connected;

FIG. 5 is a transverse sectional view taken on line 5—5 of FIG. 3;

FIG. 6 is a view similar to FIG. 5 but taken on line 6—6 of FIG. 3;

FIG. 7 is an elevational view of the left-hand end of FIG. 3 showing the concentric sleeves of the anchoring device; and FIG. 8 is an exploded view in perspective showing the anchor piece including the stud pin which connects the concentric tubes with the outer race.

DESCRIPTION OF PREFERRED EMBODIMENTS

Referring now to the drawings, in which like reference characters indicate similar parts throughout the several views, 10 indicates generally the flexible sheath which encloses the body portion of the remote control device and which may be a spirally constructed metal tubular member as is usual in such devices, it being known also that, if desired, this may be encased in a plastic waterproof covering. The sheath 10 is connected at its ends to the end members of the device, which are designated generally by reference numerals 11, and which are alike in construction. It will be observed that each device end 11 is composed of a push-pull rod 12 adapted to be fixed to the force transmitting member 16 for creating push-pull forces, or connected to the controlled element into which the push-pull forces are to be transmitted. The rod 12 has one end thereof slidably and rotatably enclosed in the bore of one end of a tubular member 13 (sometimes referred to herein as a main sleeve), by which one end of the device may be adjustably affixed to a suitable support, such as an apertured frame provided with suitable means for securing such member 13 thereto. The member 13 is externally threaded at 13d for this purpose. In the device, as shown, a telescopic guide sleeve 12a, to which the outer end of the rod 12 is fixed, is slidably mounted on the outer end portion 13a of the main sleeve hollow member 13. If desired, the guide sleeve, in certain instances, may be eliminated so that only the outer end of rod 12 will be exposed and accessible for operation of the rod 12 in push-pull fashion. The other, or inner end portion 13b of member 13, has a larger diameter and an enlarged bore and, at its inner end, is internally threaded at 13c. It is threadedly secured to the outer end 14a of a hollow cylindrical member 14 (sometimes referred to as an anchor sleeve). The inner end portion of said main sleeve hollow member 13 provides a chamber 14c which houses the anchoring device (26, 27), described in further detail hereinafter. It will be observed that the end portion 14a of another sleeve 14 fits into the internally threaded bore of member 13. It has an external thread at 14d which may be screwed into female thread 13c to secure the parts 13 and 14 together.

The outer end of member 14 provides an annular shoulder 14e for retaining the anchoring means 26, 27 rotatably mounted within the chamber 14c with minimum endwise or longitudinal movement. The sheath 10 is mounted on the inner end 14f of member 14 in known manner. The inner end of the sliding rod 12 enclosed by the tubular main sleeve member 13 is provided at its inner end with a slot 15 which receives the outer end of the longitudinally reciprocable flat force transmitting member 16. The rod 12 is secured to the transmitting member 16 by suitable means such as pins 17, or set screws. It will be understood that the flat force transmitting member 16 extends throughout the length of the device, passing through the anchoring means (26, 27); there being such anchor means at both end portions 11 of the device. The side faces of the force transmitting member 16 are provided with centrally located, longitudinally extending grooves 18 with which are engaged two oppositely disposed rows of spaced bearing balls 19. The balls 19 in each row are maintained in given spaced alignment by means of a longitudinally extending cage 20 which may be of known construction. As shown, the cages 20 are of a known type which include ball spacing retainers 20a. The cages permit rolling of the balls in their engaging grooves or races while maintaining the balls in each row at longitudinally spaced intervals. On both sides of the two rows of balls 19 and in contact with them are two flat guides or outer races 21, each of which is provided with a longitudinal groove 22 in which the balls run. It will be noted from FIGS. 2 and 3 of the drawings that the ends of the ball cages 20 and the outer races 21 extend through the cylindrical opening of the concentric cylindrical tubes 26, 27 at all positions of the stroke of the force transmitting member 16. The tubes and radially extending anchor pins, later described, provide means for anchoring the ends of the outer races or guideway strips 21.

The outer end portions 21a of the outer races 21 and the outer end portions 20b of the cage strips 20 of the device are surrounded by the concentric coaxial cylindrical tubes 26, 27 which are rotatably mounted in the tube chamber 14c; the inner tube 26 having an outside diameter slightly less than the inside diameter of the outer tube 27 so that it is readily slidable and rotatable within the outer tube; and the outer tube having an outside diameter slightly less than the inside diameter of tube chamber 14c so that it is readily rotatable within the bore of the tube chamber 14c with minimum longitudinal play. Each of the tubes 26, 27 is provided with two slots 28, 28' and 29, 29' respectively; the slots on each tube having a configuration and arrangement similar to the slots on the other tube. The slots on each tube are closed and spaced from the ends of the tube and the slots on each tube are located directly opposite each other. And it will be noted that slot 29' of tube 27 and slot 28' of tube 26 spiral in one direction and slot 29 of tube 27 and slot 28 of tube 26 spiral in the opposite direction. Each of the slots in each tube, as shown, extends along an approximately 35° spiral. The slots 28, 29 spiral clockwise in a downward direction and the slots 28', 29' spiral counterclockwise in the downward direction so that such slots are disposed in diverging relation from one end of the tube. But it will be understood that the angle of the spirals may be other than 35°. The inner tube 26 is rotatably mounted within the outer tube 27, so that the slots 28, 28' of the inner tube 26 cover the slots 29', 29 respectively of the outer tube to form open approximately square spaces 30 on diametrically opposite sides of the assembly of tubes 26, 27, these openings being perhaps more accurately described as diamond shaped, in that the two of the oppositely disposed angles between the sides, although equal, are greater than 90° and the other two angles are less than 90°. Connected to the outer races are anchor piece followers 31, having outwardly extending studs 31a; the studs 31a extending radially outward through the oppositely disposed diamond shaped openings 30. These studs 31a are advantageously of the same diamond shaped cross section as the openings 30 through the walls of the concentric tube assembly 26, 27. It will be seen from the foregoing that when the tubes are assembled, slots 28 and 29' form a pair of associated slots, and slots 28' and 29 form an oppositely disposed pair of associated slots.

The anchore pieces 31, shown more particularly in FIG. 8, each comprises a base part 31b and an integral pin portion 31a extending outwardly from the outside face 31c of the base. The anchor pieces 31 are so constructed that when they are connected to the outer races as described hereinafter, the axial passageway through the concentric tubes 26, 27 is free from any obstruction that would interfere with or impede the movement of the balls 19 or their cages through the passageway. Hence, one of the drawbacks of prior art devices is eliminated.

The base 31b has a flat bottom and a peripheral configuration corresponding to an elongated recess 32 in the outer face 21c of race 21 to receive the base portion 31b of the anchor piece with a close fit. The outer surface 31c of base 31b has a cross-wise curved configuration having a radius corresponding to the radius of the curvature of the outside face 21c of the outer races 21 and the inside cylindrical surface of tube 26 (see FIG. 5). The depth of the recess 32, which receives the base 31b of the anchor piece, is such as to leave a wall of metal 21d between the bottom of the recess and the ball groove 22. The outer surface 31c lies flush with the outer surface 21c of the race. Consequently, the longitudinal groove 22 along the length of the guide race 21 is not interrupted by a bore or otherwise (see FIG. 5). The length of the base 31b longitudinally from the pin on each side is sufficiently long to provide ample bearing area engaging the inner surface of the inside tube 26, so that when the outer races are moved longitudinally in the device, unwanted tipping or cocking of the anchor piece is prevented. Preferably, the length of the base part 31b should be at least seventy-five percent of the length of the concentric tubes 26, 27, and desirably even longer. The diamond-shaped studs or pins 31a of the anchor pieces pass through the openings 30 with a snug but slidable fit. The diamond shape is advantageous over a cylindrical pin in that more bearing area is provided than is afforded by a cylindrical pin. When under load, a cylindrical pin tends to deform the sides of the diamond-shaped openings 30 in the walls of the tubes 26, 27.

The outer ends of tube assembly 26, 27, which is housed in the enlarged bore or chamber 14c of the main sleeve 13, engage the annular shoulder 35 provided by the enlarged bore in sleeve 13 (see FIG. 3). This shoulder restricts longitudinal movement of the tube assembly in an outward direction. Movement of the tube assembly inwardly is restricted by the outer terminal end 14e of the anchor sleeve 14. It will now be seen that the coaxial concentric tubes of the assembly 26, 27 are housed in chamber 14c against longitudinal movement therein, but are free to rotate about their axis relative to the member 13 and to each other. It will be understood that as the tubes 26, 27 rotate relative to each other in one direction or the other, the diamond-shaped openings formed by the slots will move longitudinally of the tube assembly but in opposite longitudinal directions for each such direction of rotational movement. The range of rotational movement of the tubes 26, 27 in one direction or the other will be limited by at least one of the follower pins 31a coming into engagement with one end of a slot in the tubes.

It will be seen from the foregoing that the outer races 21 and the two rows of longitudinally spaced balls 19 in their strip cages 20 pass through the central axial passageway of the hollow tube assembly 26, 27, and the end portions of the outer races will be anchored by the anchoring means provided by the tube assembly 26, 27 and anchor pieces 31. With the extension of the end portions of the outside races 21 outwardly beyond the anchorng means and providing for movement of the balls in their cages through the tube assembly 26, 27, it is possible to reduce the unsupported length of the force transmitting member 16 inwardly of the anchoring means, so that the transmitting member 16 is supported between the two rows of balls 19 throughout its entire length between the anchoring means positioned in the two end members 11. Prior devices, utilizing a split type cylindrical anchoring means having outwardly projecting pins connecting the outer races, did not permit the balls to extend through the anchoring means and as a result there was a certain length of the force transmitting member unsupported inwardly of the anchoring means. A concentric tube type of anchoring means, such as disclosed in the above mentioned U.S. Patent No. 3,287,990, permitted the ball cages to enter only part way into the area of the anchoring means. Although this latter mentioned type could maintain the unsupported length of the force transmitting member inwardly of the anchoring means at midstroke to perhaps one-quarter of the stroke at each end, and to perhaps one-half of the length of the stroke at the end of the stroke, the transmitting member at the end of a full stroke remained unsupported inwardly of the anchoring means at one end of the other for a distance equal to at least one-half the length of the stroke. In contrast, in accordance with this invention, the ball cages and balls are capable of extending through the anchoring device at both ends a sufficient distance that at no position of the transmitting member throughout its stroke will all of the balls move out of the anchoring device. In other words, some balls are within the concentric tubes at all times at both ends of the device and the force transmitting member is supported by the balls throughout its entire length between the anchoring means which are located at both ends of the remote control device. Hence, a substantially longer length of the force transmitting member 16 is supported by the balls 19 engaging the grooves on each side of such force transmitting member, because the outer races and balls pass through the axial passageway through the concentric tubes 26, 27. Also, by extending the outer races 21 outwardly from the anchoring means to the end of main sleeve 13, the push-pull rod 12 will at all times, when moved, ride within the two outer races and maintain them separated, thus allowing the ball guide cages to move freely to and fro in that area which is outward of the anchoring means, i.e., the area forward of the anchoring device. Moreover, the push-pull rod may travel up to the anchoring device, thus eliminating the need to increase appreciably the rigid length of the end fittings on either end of the control length of the force transmitting member. Also it is significant to note that the force transmitting member 16 passes through the anchoring means under rolling friction as distinguished from sliding friction which is characteristic of prior art push-pull devices.

It will be seen that the above described construction enables the flexible body 10 of the remote control device to be bent in two directions. When the flexible body is bent in either of such directions, the outer race 21 which will be on the outside of the curve of the bend, will recede thus forcing its associated follower 31 to be drawn in an inward direction and in doing so, causing such follower to rotate the coaxial tubes 26, 27 in opposite directions. The other follower 31 will cooperate by travelling in the opposite direction and forcing the tubes to rotate in the same directions as under the force of said associated follower. These movements of the two followers will compensate for the differential lengths of the outer races caused by the bending operation. When the flexible body part 10 is bent in the other, or opposite, direc tion, the same operation will be performed but the movements of the outer races, the followers, and the coaxial tubes will be reversed. When the control device reaches its operative position, the followers with their connected outer races come to rest and any load that is applied through the outer races is equalized between the two races because then they are both fixed while the force transmitting member 16 is actuated in both tension and compression.

What is claimed is:

1. A flexible remote control device for transmitting traction or compression forces, comprising a flexible tubular sheath, a flat flexible force transmitting member adapted to move to and fro in said sheath, a pair of flexible flat elongated guide members arranged in said sheath on opposite sides of said transmitting member, spaced rolling elements between said guide members and said transmitting member, a pair of coaxial tubes located at at least one end of said device and rotatable relative to each other and having an axial passageway therethrough, means rotatably supporting said pair of coaxial tubes in said device and limiting axial movement thereof in at least one direction, each of said coaxial tubes in said pair of tubes being provided with a pair of oppositely disposed slots extending generally in inclined relation lengthwise of the tube, each slot on one of said coaxial tubes being associated with a slot on the other coaxial tube and said associated slots in each pair thereof being inclined in opposite directions so that such associated slots in each pair thereof cross to form at their juncture a space through both of said tubes, the inclinations of the associated slots in each pair thereof being such that the space formed by one pair of associated slots is movable lengthwise of the device in directions opposite to the movements of the space formed by the other pair of associated slots as said tubes are rotated relative to each other, and a follower connected to each of said guide members and extending outwardly solely from the outer face of the connected guide member into one of said spaces, said tubes surrounding some of said rolling elements and said axial passageway being free from any obstruction that would impede movement of the surrounded rolling elements through said passageway.

2. A flexible remote control device as defined in claim 1, in which said spaces formed by the associated slots of said tubes are diamond shaped and said followers are diamond shaped in cross section corresponding to the diamond shape of said spaces.

3. A flexible remote control device as defined in claim 1, in which each of said followers comprises an elongated base portion and a stud pin extending outwardly from said base portion, said base portion resting in a recess in the outer face of its connected guide member so that no part of said base portion extends outwardly from said outer face.

4. A flexible remote control device as defined in claim 3, in which said spaces are diamond shaped and the cross section of said stud pins is of corresponding diamond shape.

5. A flexible remote control device for transmitting traction or compression forces, comprising tubular end members, a flexible tubular sheath connected at each end to one of said end members, a flat flexible force transmitting member adapted to move to and fro in said sheath and extending into said end members, a pair of flexible flat elongated guide members arranged in said sheath on opposite sides of said transmitting member, rows of spaced rolling balls between said guided members and said transmitting member, a coaxial cylindrical chamber in at least one of said end members, a pair of coaxial tubes mounted in said chamber, to be rotatable relative to each other and having an axial passageway therethrough, said chamber having means limiting axial movement of said coaxial tubes, each of said coaxial tubes in said pair thereof being provided with a pair of oppositely disposed closed slots extending generally in inclined relation lengthwise of the tube, each slot on one of said coaxial tubes being associated with a slot on the other coaxial tube and said associated slots in each pair thereof being inclined in opposite directions so that such associated slots in each pair thereof cross to form a diamond-shaped space through the walls of said tubes, the inclinations of the associated slots in each pair thereof being such that the space formed by one pair of associated slots is movable lengthwise of said chamber in a direction opposite to the movement of the space formed by the other pair of associated slots as said tubes are rotated relative to each other, a stud connected to each of said guide members and extending outwardly solely from the outer face of the connected guide member through one of said spaces in the walls of said tubes, the end portions of said guide members and rows of balls extending through said axial passageway so that said transmitting member may move to and fro through said passageway with rolling friction as distinguished from sliding friction.

6. A flexible remote control device as defined in claim 5, in which said studs are diamond shaped in cross section corresponding to the shape of said spaces and extend through said spaces with a snug but slidable fit.

7. A flexible remote control device as defined in claim 6, in which each of said outwardly extending studs is secured to a long base, said base resting in a recess in the outer face of its connected guide member so that no part of said base extends outwardly from said outer face.

References Cited

UNITED STATES PATENTS

| | | | |
|---|---|---|---|
| 396,147 | 1/1889 | Monnin | 74—57 |
| 1,509,620 | 9/1924 | Taylor | 74—57 X |
| 2,116,142 | 5/1938 | Chappell et al. | |
| 3,287,990 | 11/1966 | Ellinger | 74—501 |

MILTON KAUFMAN, *Primary Examiner.*